United States Patent
Gabrani et al.

(10) Patent No.: US 10,339,651 B2
(45) Date of Patent: Jul. 2, 2019

(54) SIMULTANEOUS FEATURE EXTRACTION AND DICTIONARY LEARNING USING DEEP LEARNING ARCHITECTURES FOR CHARACTERIZATION OF IMAGES OF HETEROGENEOUS TISSUE SAMPLES

(71) Applicant: International Business Machines Corporation, Armonk, NY (US)

(72) Inventors: Maria Gabrani, Thalwil (CH); Chiara Marchiori, Birmensdorf (CH); Bogdan Prisacari, Adliswil (CH); Erwan Zerhouni, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,445

(22) Filed: Oct. 28, 2016

(65) Prior Publication Data

US 2018/0121759 A1 May 3, 2018

(51) Int. Cl.
| | |
|---|---|
| *G06K 9/62* | (2006.01) |
| *G06T 7/00* | (2017.01) |
| *H04N 19/136* | (2014.01) |
| *G06K 9/00* | (2006.01) |
| *G06K 9/46* | (2006.01) |

(Continued)

(52) U.S. Cl.
CPC .......... *G06T 7/0012* (2013.01); *G06K 9/0014* (2013.01); *G06K 9/00147* (2013.01);
(Continued)

(58) Field of Classification Search
None
See application file for complete search history.

(56) References Cited

U.S. PATENT DOCUMENTS

| | | | |
|---|---|---|---|
| 7,761,240 B2 | 7/2010 | Saidi et al. | |
| 9,373,059 B1 * | 6/2016 | Heifets | .................. G06F 19/16 |

(Continued)

FOREIGN PATENT DOCUMENTS

WO    WO 2015/058044 A1    4/2015

OTHER PUBLICATIONS

Hang Chang et al., Characterization of Tissue Histopathology Via Predictive Sparse Decomposition and Spatial Pyramid Matching, Med Image Comput Assist Interv. Author manuscript; available in PMC Apr. 24, 2014, pp. 1-6.

(Continued)

*Primary Examiner* — Stephen P Coleman
(74) *Attorney, Agent, or Firm* — Daniel P. Morris; Otterstedt, Ellenbogen & Kammer, LLP (57) ABSTRACT

Apparatus, methods, and computer-readable media are provided for simultaneous feature extraction and dictionary learning from heterogeneous tissue images, without the need of prior local labeling. A convolutional autoencoder is adapted and enhanced to jointly learn a feature extraction algorithm and a dictionary of representative atoms. While training the autoencoder an image patch is tiled in subpatches and only the highest activation value per sub-patch is kept. Thus, only a subset of spatially constrained values per patch is used for reconstruction. The deconvolutional filters are the dictionary elements, and only a deconvolution layer is used for these elements. Embodiments described herein may be provided for use in models for representing local tissue heterogeneity for better disease progression understanding and thus treating, diagnosing, and/or predicting the occurrence (e.g., recurrence) of one or more medical conditions such as, for example, cancer or other types of disease.

21 Claims, 6 Drawing Sheets

(52) U.S. Cl.
CPC ......... *G06K 9/4628* (2013.01); *H04N 19/136* (2014.11); *G06T 2207/20021* (2013.01); *G06T 2207/30004* (2013.01)

(56) References Cited

U.S. PATENT DOCUMENTS

| | | | | |
|---|---|---|---|---|
| 2009/0196475 | A1* | 8/2009 | Demirli | A61B 5/441 382/128 |
| 2015/0238148 | A1* | 8/2015 | Georgescu | A61B 5/7267 600/408 |
| 2015/0278642 | A1* | 10/2015 | Chertok | G06N 3/02 382/156 |
| 2016/0005183 | A1* | 1/2016 | Thiagarajan | A61B 5/055 382/131 |

OTHER PUBLICATIONS

Jerome Lehaire et al., Computer-Aided Diagnostic System for Prostate Cancer Detection and Characterization Combining Learned Dictionaries and Supervised Classification, 2014 IEEE International Conference on Image Processing (ICIP) Date of Conference Oct. 27-30, 2014 (Abstract only pp. 1-3).

Xiaorui Ma, Spectral-Spatial Classification of Hyperspectral Image Based on Deep Auto-Encoder, IEEE Journal of Selected Topics in Applied Earth Observations and Remote Sensing (vol. PP, Issue: 99) Date of Publication Feb. 11, 2016 (Abstract only pp. 1-3).

Tong Tong et al., Extraction of Features From Patch Based Graphs for the Prediction of Disease Progression in AD, intelligent Computing Theories and Methodologies vol. 9226 of the series Lecture Notes in Computer Science pp. 500-509 Date: Aug. 11, 2015 (Abstract only pp. 1-3).

Tiep H. Vu et al., DFDL: Discriminative Feature-Oriented Dictionary Learning for Histopathological Image Classification, IEEE International Symposium on Biomedical Imaging (ISBI), Feb. 3, 2015, pp. 1-5.

Jeroen A.W.M. van der Laak et al., Hue-saturation-density (HSD) model for stain recognition in digital images from transmitted light microscopy, J. Int. Soc. for Advancement of Cytometry, vol. 39, Issue 4 Apr. 1, 2000 pp. 275-284, on-line reprint pp. 1-18.

* cited by examiner

FIG. 6B

SIMULTANEOUS FEATURE EXTRACTION AND DICTIONARY LEARNING USING DEEP LEARNING ARCHITECTURES FOR CHARACTERIZATION OF IMAGES OF HETEROGENEOUS TISSUE SAMPLES

BACKGROUND

The present invention in the technical field of processing of images (e.g., tissue images) and feature extraction from the same for, for example, treating, diagnosing, and/or predicting the occurrence (e.g., recurrence) of one or more medical conditions (e.g., cancer or other types of disease).

Conventional approaches to analyze tissue images have been prone to misclassification of objects in tissue and may produce incorrect results or misdetections. These problems are exacerbated by the inherent tissue heterogeneity and potential variations in image acquisition conditions, imprecise labeling, and image artifacts.

The availability of tissue images processed with specific procedures to emphasize certain characteristics has allowed computerized methods to be applied to tissue imaging. Immunohistochemistry (IHC) staining further enables the evidencing, through multicolor visualization, of target protein expression in cells of human tissue. It is used to identify patients most likely to respond to targeted therapy. Currently, IHC image analysis focuses on the staining intensity, performed mostly in a manual and thus low throughput, labor intensive, and subjective way. Emerging computational techniques use metrics like the H-score, or the Aperio metric. Recent studies, however, show that to tailor a patient's treatment and to monitor treatment progression, finer granularity grading is necessary. Thus, the analysis needs to go beyond staining intensity and take into account the morphological and cellular architectures that continue to define cancer and many diseases.

Existing machine learning approaches have faced several challenges. First, there is a high degree of heterogeneity. FIG. 1A, FIG. 1B, FIG. 1C, and FIG. 1D show several tissue samples exemplifying the heterogeneity. This heterogeneity can occur inter- and intra-tissue samples. This heterogeneity can also occur inter- and intra-procedures. Second a mix of local and global features has created challenges. Third, the images sizes are typically large (often 3 to 5 orders of magnitude larger than radiology images). Finally, labeling in the images can be imprecise. The global label of the image may be incorrect, or the label might not be representative of all regions of the image.

More accurate, reliable, and repeatable systems and methods for representation, and feature extraction from tissue images are needed, for example, to allow for more in depth disease progression understanding, and the generation of improved predictive models for diagnosing, treating, and/or predicting the occurrence of medical conditions. Furthermore, a robust apparatus and method for extracting small, but representative image characteristics is needed.

SUMMARY

This summary is provided with the understanding that it will not be used to limit the scope or meaning of the claims.

The present invention relates to the use of a mix of representation learning and dimensionality reduction. The present invention further relates to the use of deep architectures, such as modified autoencoders, to perform both simultaneously. Autoencoders are an artificial neural network used for learning efficient codings. The use of an autoencoder allows the system to learn a representation for a set of data for the purpose of dimensionality reduction. The invention, in an aspect, enables the generation of a dictionary of representative atoms that not only serves a technical purpose of allowing dimensionality reduction but also can be used to extract a disease signature or to study tissue heterogeneity in a quantitatively way, without the need of prior local cell classification (labeling).

In embodiments, the system uses a pre-trained convolutional network to extract features that capture both morphology and color from image patches around identified stained cells. The system generates a features dictionary, whose size is data dependent. To represent tissue and tumor heterogeneity, the system captures spatial layout information using a commute time matrix approach. The present invention, in embodiments, can be integrated into other flows.

In an aspect, the invention, as part of a pipeline, is able to improve robustness and accuracy of the pipeline's performance by enabling the enforcement of several levels of sparsity. Sparsity per patch is performed for mapping, and sparsity per staining is performed for dictionary representation. The enforcement of sparsity can be done at a per patch level that is data dependent.

The invention, in another aspect, replaces patch characterization done by hard assignment (clustering) by a more fine grained approach through the use of dictionary elements (filters) soft assignment. Instead of a patch being mapped to a single cluster, each patch is described as a weighted linear combination of a sparse set of dictionary elements. This approach enables projecting histological image patches to a smaller and more representative feature space, which is particularly useful for ulterior cognitive inference. The approach further enables the generation of a dictionary of representative atoms that not only serves a technical purpose of allowing dimensionality reduction but also can be used as a disease signature and visual inspection.

In an embodiment, an apparatus comprises an autoencoder having an input component, and output component, where the autoencoder is configured to be trained to jointly learn a set of descriptive features and a dictionary of representative atoms, receive an image, and process the image to assign to the image at least one representative atom from the dictionary of representative atoms. In an optional embodiment, the autoencoder is trained by tiling a patch in subpatches and keeping only a highest activation value per subpatch. In a preferred embodiment, the input component is configured to receive an image and convert the pixels of the image into numerical values. In a further optional embodiment, the input component has a convolutional stack, and the convolutional stack comprises a plurality of convolutional layers. The output component comprises a deconvolutional stack, the deconvolutional stack comprising a deconvolutional layer, and the deconvolutional layer comprises a set of learned filters in certain embodiments. In a preferred embodiment, the set of learned filters comprises dictionary elements.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1A:
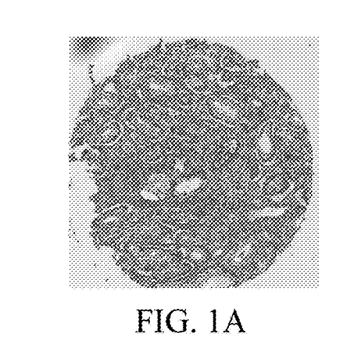
FIG. 1A illustrates a tissue sample.
Figure 1B:
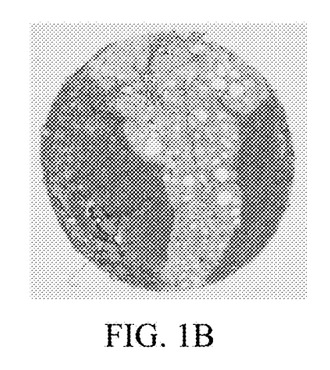
FIG. 1B illustrates a tissue ample.
Figure 1C:
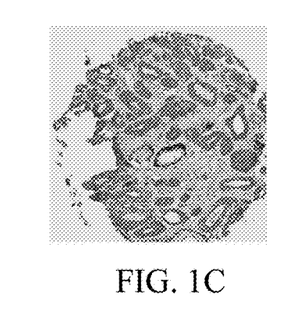
FIG. 1C illustrates a tissue sample.
Figure 1D:
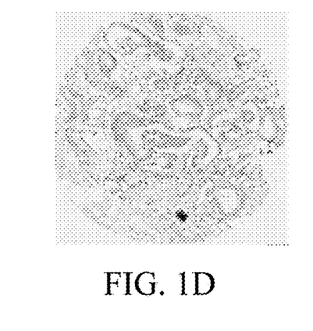
FIG. 1D illustrates a tissue sample.
Figure 2:
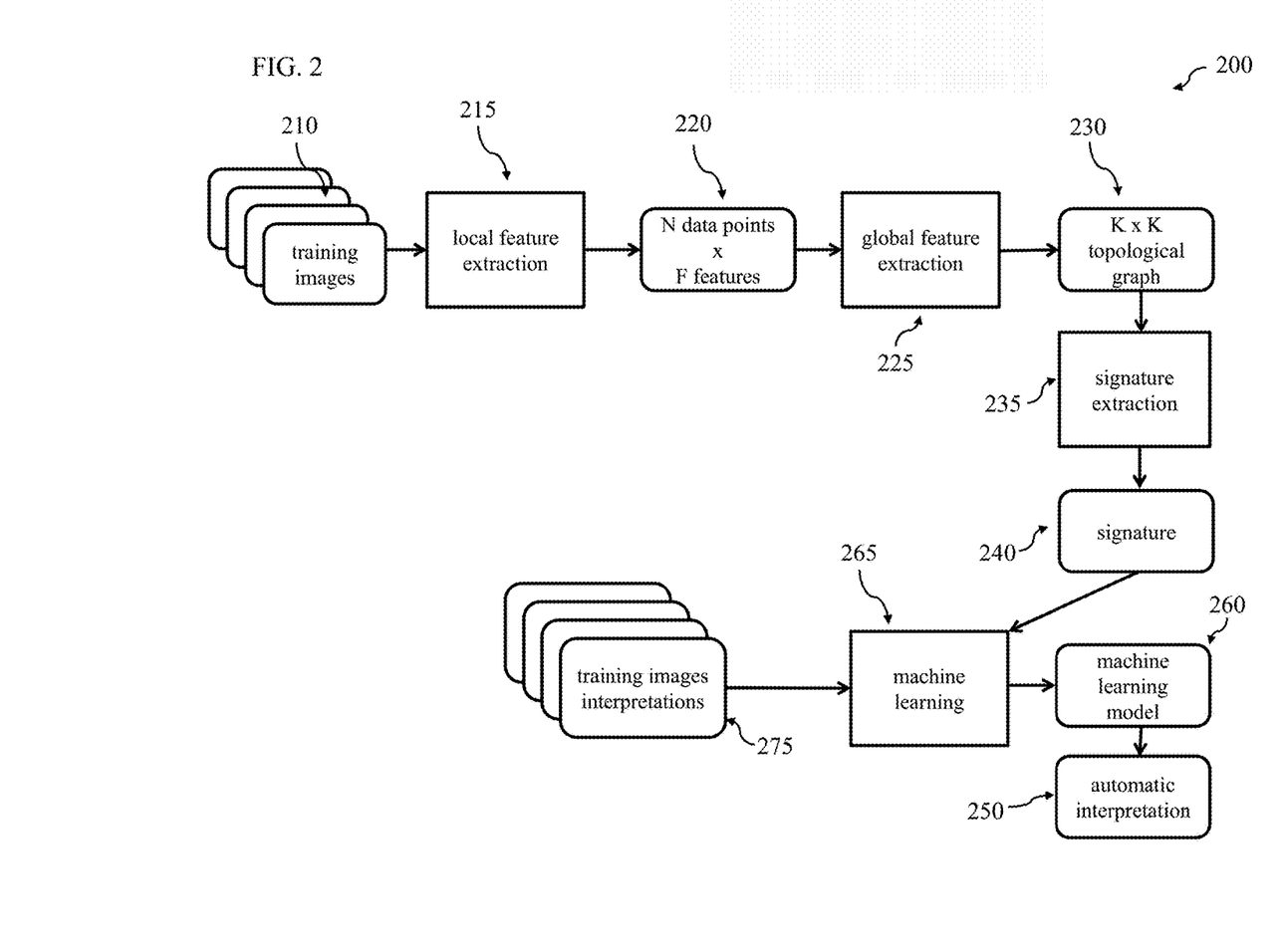
FIG. 2 illustrates a general cognitive pipeline, according to an embodiment of the invention.

FIG. 2 illustrates a general cognitive pipeline 200, according to an embodiment of the invention. The original image 210 (examples of which are shown in FIG. 1) is fed into the local feature extraction block 215. The local feature extraction 215 generates an N data points×F features data 220. The N data points×F features data 220 is fed into a global topology extraction 225 step, which generates a K×K topological graph 230. The K×K topological graph 230 is fed into a signature extraction 235, which generates a signature 240. A machine learning block 265 uses a set of training images 270 and a set of training interpretations 275 to generate a machine learning model 260. The machine learning model 260 produces an automatic interpretation 250.

Figure 3:
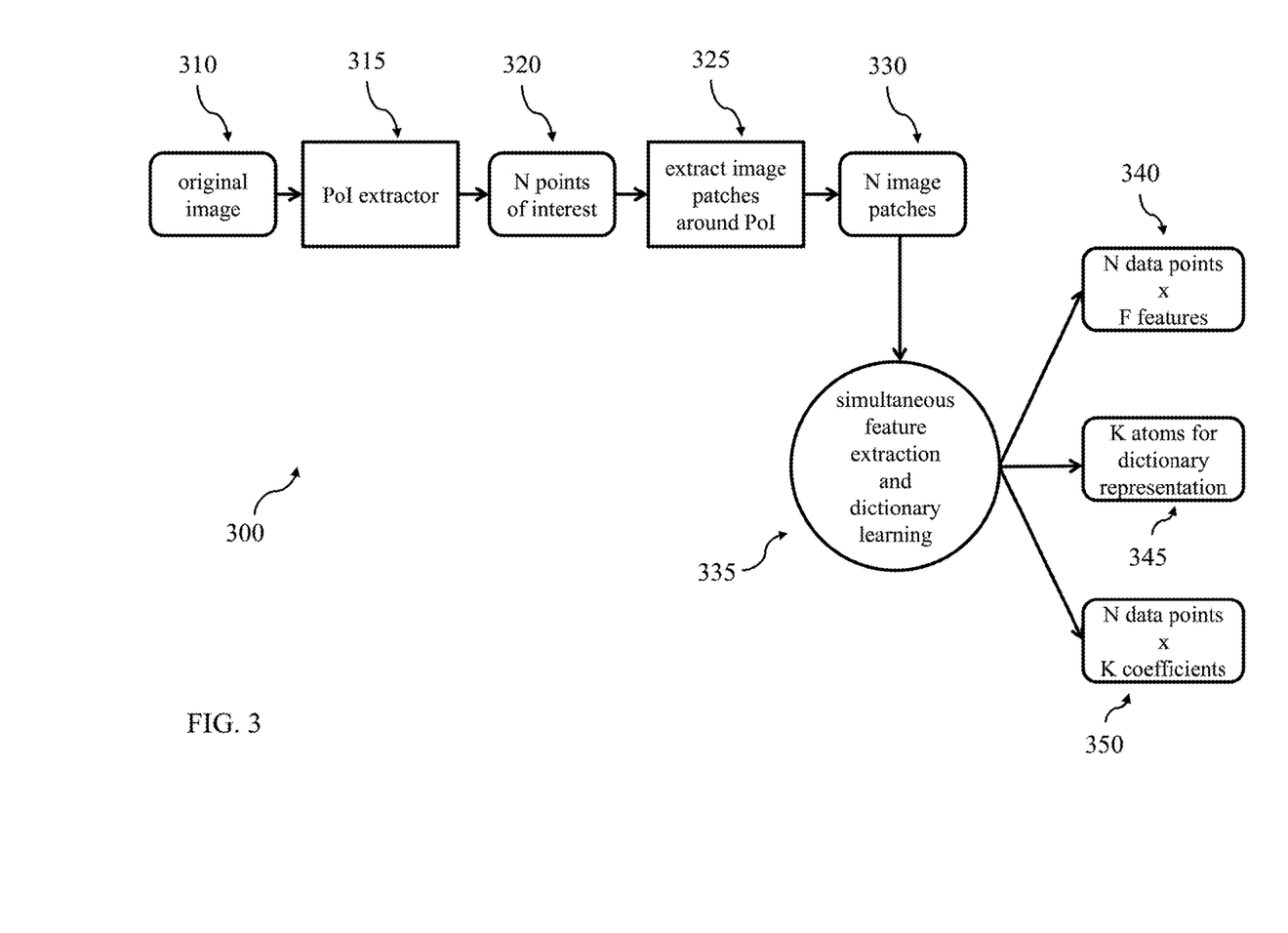
FIG. 3 illustrates the feature extraction steps, according to an embodiment of the invention.

FIG. 3 illustrates the feature extraction steps, according to an embodiment of the invention. The original image 310 is fed into a Points of Interest (PoI) extractor 315, which produces N points of interest 320. On a per image basis, the PoI extractor 315 identifies the location of both stained and unstained cells. The method for identification can follow that of Van der Laak et al., "Hue-saturation-density (hsd) model for stain recognition in digital images from transmitted light microscopy," Cytometry, 2000. The N points of interest 320 are fed into a step to extract image patches around PoI 325, which produces N image patches 330 by extracting windows of a given size around the points of interest. The N image patches 330 are fed into the simultaneous feature extraction and dictionary learning block 335, which generates N data points×F features 340 output, a K atoms for dictionary representation 345 output, and a N data points×K coefficients 350 output. Per patch, the simultaneous feature extraction and dictionary learning block 335 is able to compute features that capture the morphology of the area around the cells.

Figure 4:
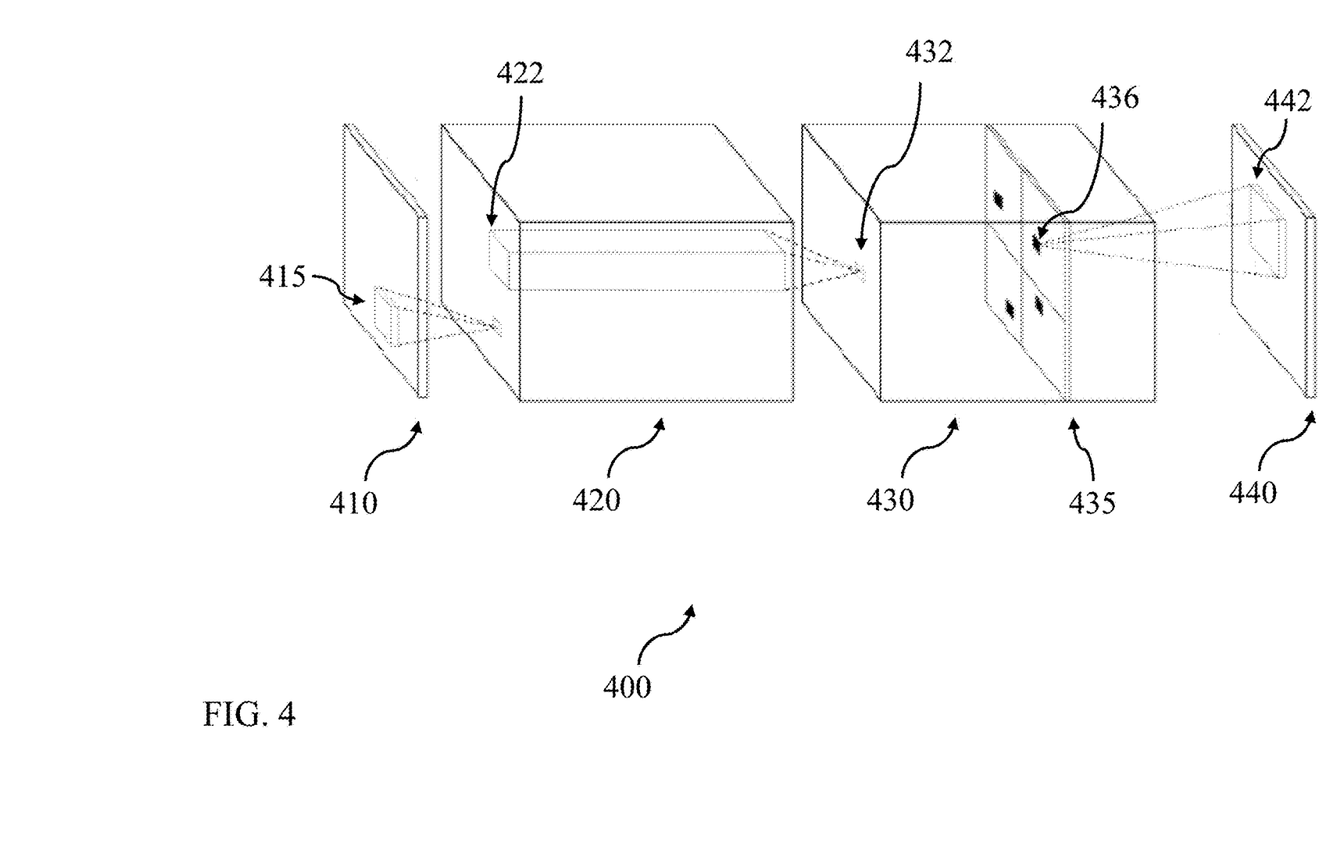
FIG. 4 illustrates the system architecture, according to an embodiment of the invention.

FIG. 4 illustrates the system architecture, according to an embodiment of the invention. The encoding part consists of a stack of several convolutional layers, each followed by batch normalization in order to accelerate the training process. ReLU is used as activation function after each batch normalization layer. The decoder consists of a single linear deconvolutional layer. When training, a spatial sparsity constraint is imposed to improve robustness and the quality of the learned filters. However, after computing the final output of the encoding part, reconstruction is not performed using the raw output.

The largest activation value for each 16×16 sub-patch is kept, leading to several activation values per feature map per input patch. The 16×16 max-pooling sub-patch is chosen to balance the tradeoff between reconstruction precision and generalization. The rest of the activations and their derivatives are then set to zero. This is similar to the max-pooling approach, with the difference that the size of the output is not changed. The decoding part reconstructs the original patch using only the sparsified encoding, and the reconstruction error is only backpropagated through the previously selected activation units.

The apparatus comprises an input component 410, or layer, having a convolutional stack and an output component 440, or layer. The input component 410 receives the input data, such as the input image and can convert the image data into numerical representations. The convolutional stack can comprise an arbitrary number of layers, such as a first convolutional layer 420 and a second convolutional layer 430. An input component 410 receives an input image. The input image can be segmented into at least one patch 415. The first convolutional layer 420 can be fully connected in an embodiment. The first convolutional layer 420 comprises a set of learnable filters (or kernels), which have a small receptive field, but can extend through the full depth of the input volume. Each filter is convolved across the width and height of the input image producing a 2-dimensional activation map 432 of that filter. The activations maps for all filters can be stacked along the depth dimension to form the full output volume of the first convolutional layer 420. The first convolutional layer can also perform pooling, such as max pooling. This process partitions the input image into a set of rectangles 435 and, for each such sub-region, outputs the maximum 436. Pooling can operate on every depth slice of the input. The output component 440 (decoder) can be coupled to the input component and the convolutional stack by a sparsity layer. The output component 440 has a deconvolutional stack of a single layer. The learned filters of this component 440 become the dictionary elements. The output component 440 assigns to the input image at least one representative atom of the dictionary.

In an embodiment, the dictionary elements are learned as an integral part of the feature extraction step, and are represented precisely by the filters learned in the decoding step, whose weighted linear combination is used to reconstruct the image. To determine the weight assigned to each dictionary element in the representation of a given input, the following steps are performed. After applying the spatial sparsification of the output of the encoding step, the mean activation value per feature map as the weight of each deconvolutional filter is computed. In addition, only the s highest values of these mean activation values is kept and the rest are set to 0. The sparsity s of the dictionary representation is a meta-parameter that is set through cross-validation. Finally, the weight vector of each input is scaled to unit norm and the resulting vector is used as the dictionary assignment. The change to the dimensionality reduction step of the framework no longer allows the projection of the point of interest graph to the dictionary elements graph to be performed. The weight computation is changed to $$w(D_i, D_j) = \sum_{k=1}^{N} \sum_{l=1}^{N} w_{kl} \cdot g_i(k) \cdot g_j(l),$$

where $g_i(k)$ corresponds to the value assigned to dictionary atom $D_i$ for the point of interest k.

The principle behind this dimensionality reduction is as follows. The approach herein aims to detect and learn the main morphological and color patterns of cells that appear in tissue, especially in heterogeneous tissue. Thus, an objective is to represent a cell by combining the main patterns that describe it. In that manner, the dominant patterns (deconvolutional filters) that comprise the diverse cell types within a stained tissue type are identifiable, potentially also across stainings. The sparsity of the dictionary representation s is cross validated in order to find the optimum for each staining.

Figure 5A:
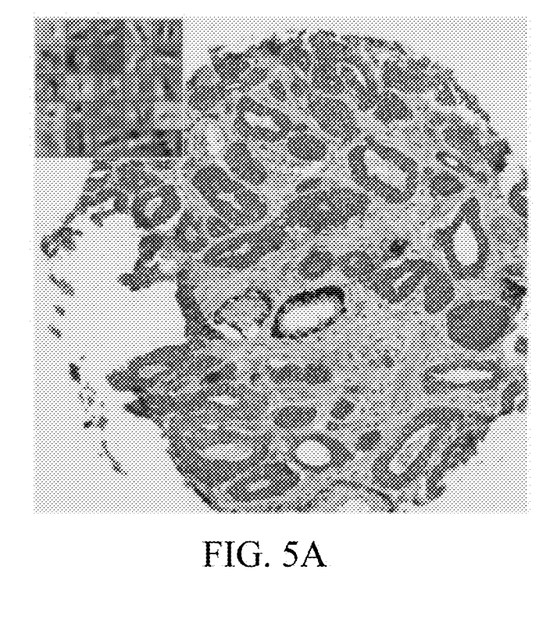
FIG. 5A illustrates an example output, according to an embodiment of the invention.
Figure 5B:
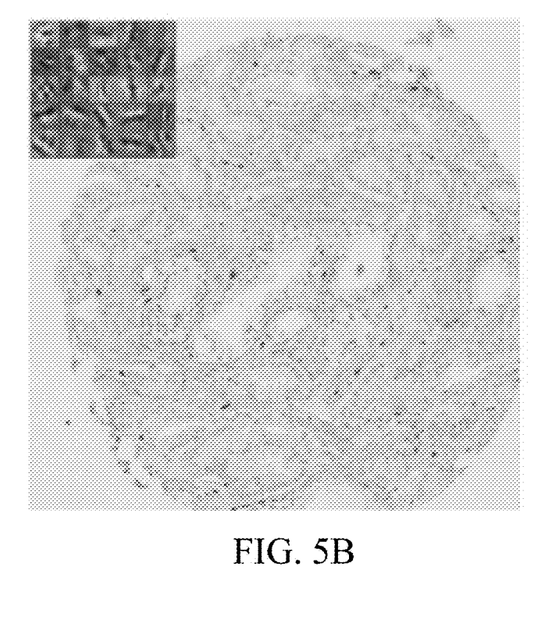
FIG. 5B illustrates an example output, according to an embodiment of the invention.
Figure 6A:
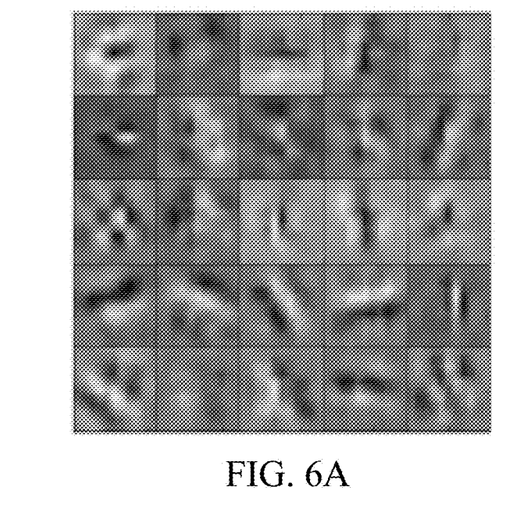
FIG. 6A illustrates an example output, according to an embodiment of the invention.
Figure 6B:
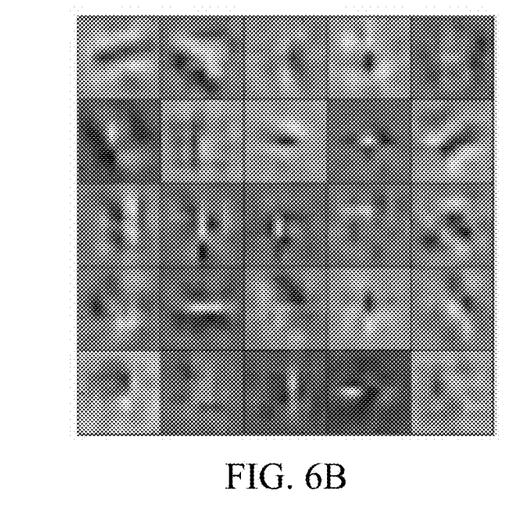
FIG. 6B illustrates an example output, according to an embodiment the invention.

FIG. 5A illustrates an example output, according to an embodiment of the invention. In the upper left corner are the atoms associated with the tissue sample shown. Similarly, FIG. 5B illustrates an example output, according to an embodiment of the invention. Also shown in the upper left corner are the atoms associated with the tissue sample. Other example atoms are shown in FIG. 6A and FIG. 6B.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or is operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks; and optical disks. The processor and the memory can be supplemented by, or incorporated in special purpose logic circuitry.

To provide for interaction with a user, the above described techniques can be implemented on a computer having a display device for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. The computing system can include clients and servers.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An autoencoder comprising:
an input component comprising a convolutional stack and configured to receive an image; and
an output component coupled to the input component and comprising a deconvolutional stack,
wherein the input component and the output component are configured to simultaneously learn a set of descriptive features and a dictionary of representative atoms,
wherein the output component is further configured to assign to the image at least one representative atom of the dictionary of representative atoms, and
wherein the input component is trained by tiling a patch of the image in subpatches and keeping a set of s highest activation values per subpatch and setting remaining activations of each subpatch to zero thereby not changing a size of an output of the input component.

2. The autoencoder of claim 1, wherein the input component is configured to receive an image and convert the pixels of the image into numerical values.

3. The autoencoder of claim 1, wherein the convolutional stack comprises a plurality of convolutional layers.

4. The method of claim 1 wherein the representative atoms capture both morphology and color from image patches around identified stained cells.

5. The autoencoder of claim 1, wherein the number s is set by cross validation of each image.

6. The autoencoder of claim 1, wherein the deconvolutional stack comprises a deconvolutional layer.

7. The autoencoder of claim 6, wherein the deconvolutional layer comprises a set of learned filters.

8. The autoencoder of claim 7, wherein the set of learned filters comprises dictionary elements.

9. A method for simultaneous feature extraction and dictionary learning comprising:
training an autoencoder to jointly learn a set of descriptive features and a dictionary of representative atoms;
receiving an image at an input to the autoencoder; and
processing the image by the autoencoder to assign at least one representative atom of the dictionary to the image,
wherein processing the image by the autoencoder comprises tiling a patch of the image in subpatches and keeping a set of s highest activation values per subpatch and setting remaining activations of each subpatch to zero thereby not changing a size of an output of an encoding portion of the autoencoder.

10. The method of claim 9, further comprising the step: processing the image to determine a descriptive feature.

11. The method of claim 9, wherein the number s is set by cross validation of each image.

12. The method of claim 9, wherein processing the image comprises processing the image in a convolutional stack, wherein the convolutional stack comprises at least one convolutional layer.

13. The method of claim 12, wherein processing the image by the autoencoder comprises processing by a deconvolutional layer, wherein the deconvolutional layer comprises a set of learned filters.

14. The method of claim 13, wherein the set of learned filters are dictionary elements.

15. A method comprising:
receiving a first image, wherein the first image comprises a patch tiled in subpatches;
training an autoencoder with the first image to jointly learn a set of descriptive features and a dictionary of representative atoms;
receiving a second image; and
processing the second image by the autoencoder to assign at least one representative atom of the dictionary to the second image,
wherein training the autoencoder comprises keeping a set of s highest activation values per subpatch and setting remaining activations of each subpatch to zero thereby not changing a size of an output of an encoding portion of the autoencoder.

16. The method of claim 15, further comprising the step: processing the image to determine a descriptive feature.

17. The method of claim 15, wherein the numbers is set by cross validation of each image.

18. The method of claim 15, wherein the autoencoder comprises a convolutional stack, wherein the convolutional stack comprises at least one convolutional layer.

19. The method of claim 18, wherein the autoencoder comprises a deconvolutional layer, and wherein the deconvolutional layer comprises a set of learned filters.

20. The method of claim 19, wherein the set of learned filters comprises dictionary elements.

21. The method of claim 19, wherein receiving an image comprises converting the pixels of the image into numerical values.

* * * * *